(12) United States Patent
Trendov et al.

(10) Patent No.: US 10,471,987 B2
(45) Date of Patent: Nov. 12, 2019

(54) STEERING WHEEL DAMPER AND ALTERNATE POWER STORAGE DEVICE

(75) Inventors: Christopher R. Trendov, Shelby Township, MI (US); Roger M. Cortina, LaSalle (CA); Ryan J. Said, Wixom, MI (US)

(73) Assignee: FCA US LLC, Auburn Hill, MI (US)

(*) Notice: Subject to any disclaimer, the term of this patent is extended or adjusted under 35 U.S.C. 154(b) by 2129 days.

(21) Appl. No.: 13/327,015

(22) Filed: Dec. 15, 2011

(65) Prior Publication Data

US 2013/0152721 A1 Jun. 20, 2013

(51) Int. Cl.
*B62D 7/22* (2006.01)
*F16F 7/10* (2006.01)
*F16F 7/108* (2006.01)

(52) U.S. Cl.
CPC .............. *B62D 7/222* (2013.01); *F16F 7/108* (2013.01); *F16F 7/1028* (2013.01); *Y10T 74/20256* (2015.01); *Y10T 74/20834* (2015.01)

(58) Field of Classification Search
CPC .......... B62D 1/10; B62D 1/105; B62D 7/222; F16F 7/108; F16F 7/1028
USPC ... 74/479.01, 484 R, 491, 552, 574.1, 574.4; 280/732, 775, 777, 778, 779; 188/378, 188/379
See application file for complete search history.

(56) References Cited

U.S. PATENT DOCUMENTS

| | | | | |
|---|---|---|---|---|
| 2,128,069 A * | 8/1938 | Cyril | ........................ | B62D 1/08 74/552 |
| 4,405,924 A * | 9/1983 | Shinoda et al. | ........... | 340/12.54 |
| 4,712,446 A * | 12/1987 | Kamata | .................... | B62D 1/04 74/492 |
| 4,804,857 A * | 2/1989 | Hayashi | ................ | B60R 16/027 200/61.54 |
| 4,886,460 A * | 12/1989 | Olgren | .................. | B60R 16/027 439/15 |
| 4,887,843 A * | 12/1989 | Husby | ........................... | 280/735 |
| 4,946,194 A * | 8/1990 | Maeda et al. | ................. | 280/777 |
| 4,974,873 A * | 12/1990 | Kaiguchi | ............ | B60R 21/2035 200/61.58 R |
| 5,387,006 A * | 2/1995 | Vavalidis | .............. | B60R 21/017 280/731 |
| 5,410,114 A * | 4/1995 | Furuie | .................... | B60Q 5/003 200/61.55 |
| 5,722,686 A * | 3/1998 | Blackburn | ........ | B60R 21/21658 280/731 |
| 5,867,093 A * | 2/1999 | Dodd | .................... | B60Q 1/0082 340/10.2 |
| 6,164,689 A * | 12/2000 | Rivin et al. | .................... | 280/731 |
| 6,733,036 B2 * | 5/2004 | Breed et al. | .................. | 280/735 |
| 6,736,423 B2 * | 5/2004 | Simonian et al. | ............ | 280/731 |
| 7,144,034 B2 * | 12/2006 | Nash | .................... | B60R 21/2037 280/728.2 |
| 7,188,701 B2 * | 3/2007 | Patankar | ....................... | 180/446 |
| 7,464,959 B2 * | 12/2008 | Pillsbury, IV | ......... | B60Q 5/003 200/61.55 |
| 7,556,281 B2 * | 7/2009 | Olesko et al. | ............. | 280/728.2 |
| 7,774,115 B2 * | 8/2010 | Breed | ................... | B60R 21/013 180/271 |
| 7,786,864 B1 * | 8/2010 | Shostak et al. | ............ | 340/572.1 |

(Continued)

*Primary Examiner* — Zakaria Elahmadi
(74) *Attorney, Agent, or Firm* — Ralph E Smith

(57) ABSTRACT

A damper for a steering wheel is provided. The damper may include a housing attached to the steering wheel and an energy-storage medium supported by the housing.

14 Claims, 5 Drawing Sheets

(56) References Cited

U.S. PATENT DOCUMENTS

| | | | |
|---|---|---|---|
| 7,909,361 B2* | 3/2011 | Oblizajek et al. | 280/731 |
| 8,485,552 B2* | 7/2013 | Karlsson et al. | 280/731 |
| 8,632,096 B1* | 1/2014 | Quinn et al. | 280/771 |
| 2001/0022256 A1* | 9/2001 | Misaji | B62D 1/04 188/378 |
| 2002/0092699 A1* | 7/2002 | Worrell | B62D 7/222 180/443 |
| 2002/0125084 A1* | 9/2002 | Kreuzer et al. | 188/267.1 |
| 2002/0144873 A1* | 10/2002 | Kato | B62D 7/222 188/378 |
| 2003/0019704 A1* | 1/2003 | Aoi | B62D 7/222 188/378 |
| 2003/0200018 A1* | 10/2003 | Arimura | 701/41 |
| 2004/0070185 A1* | 4/2004 | Xu | B60R 21/2037 280/731 |
| 2005/0011713 A1* | 1/2005 | Yasumoto | F16F 7/108 188/373 |
| 2005/0121896 A1* | 6/2005 | Bonhard et al. | 280/779 |
| 2006/0071465 A1* | 4/2006 | Worrell et al. | 280/779 |
| 2006/0197323 A1* | 9/2006 | Pillsbury, IV | B60Q 5/003 280/731 |
| 2007/0017317 A1* | 1/2007 | Cortina et al. | 74/552 |
| 2007/0046013 A1* | 3/2007 | Bito | B60R 21/203 280/777 |
| 2007/0068335 A1* | 3/2007 | Jaarda | B62D 1/04 74/552 |
| 2007/0228703 A1* | 10/2007 | Breed | B60N 2/0232 280/735 |
| 2008/0127771 A1* | 6/2008 | Stoll | B62D 1/065 74/552 |
| 2008/0156567 A1* | 7/2008 | Brown | B66F 9/20 180/242 |
| 2009/0218739 A1* | 9/2009 | Terada | B60R 21/2037 267/2 |
| 2010/0140855 A1* | 6/2010 | Gustavsson | F16F 1/373 267/140.5 |
| 2011/0120258 A1* | 5/2011 | Kondo | B60Q 5/003 74/552 |
| 2011/0277455 A1* | 11/2011 | Spieth | 60/322 |
| 2011/0291392 A1* | 12/2011 | Karlsson et al. | 280/728.2 |
| 2012/0043171 A1* | 2/2012 | Sella | F16F 7/116 188/379 |
| 2013/0055849 A1* | 3/2013 | Parameshwara | B62D 1/065 74/558 |

\* cited by examiner

STEERING WHEEL DAMPER AND ALTERNATE POWER STORAGE DEVICE

FIELD

The present invention relates to mass dampers and more particularly to a mass damper having an energy-storage medium.

BACKGROUND

Mass dampers are used in mechanical systems to reduce mechanical vibrations. Such mass dampers typically include a mass separated from a component of the mechanical system by a spring or spring-like material that cooperates with the mass to reduce the vibration caused by operation of the mechanical system.

Conventional mass dampers may be adjusted to provide a desired frequency response by controlling a spring constant of the spring or spring-like material and/or by controlling the shape, material, and/or weight of the mass. The foregoing parameters may be adjusted to tailor the frequency response of the mass damper to the particular application and to dampen vibrations within a desired frequency range.

Vehicles may include a series of mass dampers associated with various subsystems of the vehicle. For example, a mass damper may be used in conjunction with a transmission, an engine, and a steering wheel to mitigate vibration that often results during operation of such subsystems. Mass dampers that are incorporated into a vehicle typically include a mass and an elastomeric element having a desired spring rate. The mass and elastomeric element cooperate to provide the particular subsystem with a dampening effect within a particular frequency range.

While conventional mass dampers adequately provide mechanical systems with a dampening effect, further improvement is desirable.

SUMMARY

A damper for a steering wheel is provided. The damper may include a housing attached to the steering wheel and an energy-storage medium supported by the housing.

In another configuration, a steering wheel is provided and may include a rim, a hub attached to the rim, and a mass damper supported proximate to the hub. The mass damper may include a housing and an energy-storage medium supported by the housing.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

With reference to the figures, a mass damper 10 is provided. The mass damper 10 may be used in conjunction with a steering wheel 12 of a vehicle 14 to reduce the amplitude of mechanical vibrations at the steering wheel 12 caused by operation of the vehicle 14. The mass damper 10 may reduce vibrations at a predetermined frequency or, alternatively, may be a tunable mass damper 10, whereby the vibration response of the mass damper 10 is tuned based on current operating conditions of the vehicle 14.

Figure 3:
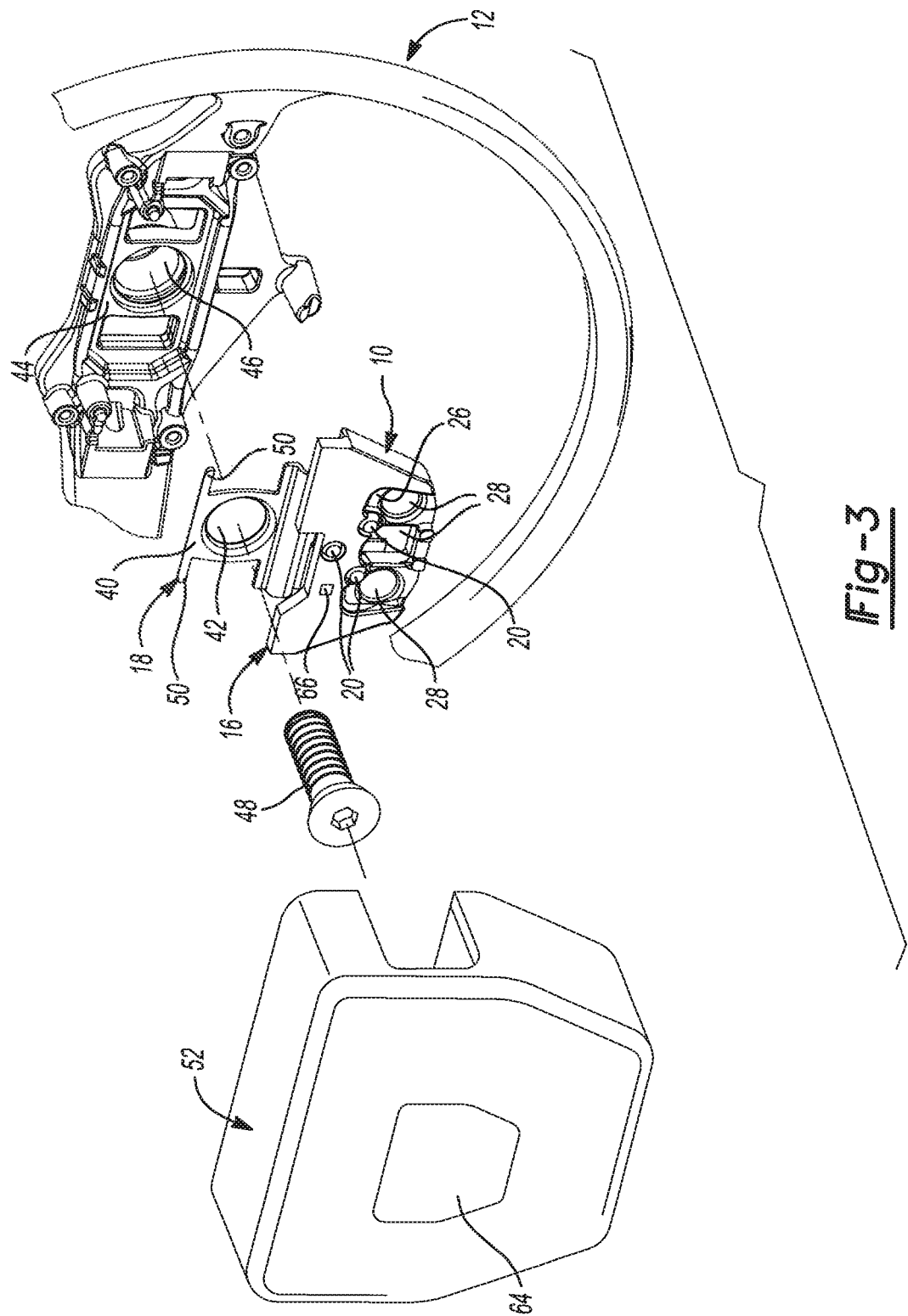
FIG. 3 is an exploded view of the steering wheel of FIG. 2.
Figure 4:
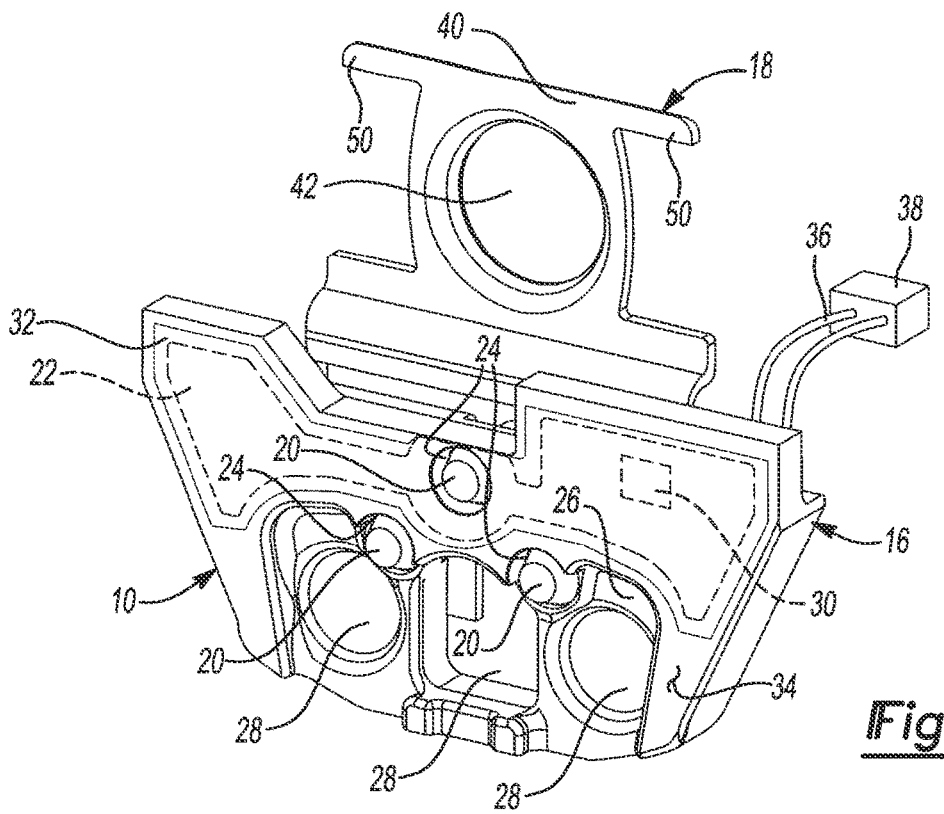
FIG. 4 is a perspective view of a mass damper in accordance with the principles of the present disclosure.

With particular reference to FIGS. 3 and 4, the mass damper 10 is shown to include a housing 16, a bracket 18, and a series of projections 20. In one configuration, the housing 16 may be constructed of lead and may include at least one internal compartment or cavity 22 (FIG. 4). The housing 16 may additionally include a series of apertures 24, a recessed portion 26, and a series of openings 28. The apertures 24 may be positioned at virtually any location of the housing 16 and may receive a portion of the projections 20 to attach the housing 16 to the projections 20. In one configuration, the projections 20 may be formed from an elastomeric material such as rubber and may be molded into the apertures 24 of the housing 16. Alternatively, the projections 20 may be retained within the apertures 24 via a suitable adhesive.

The recessed portion 26 may be formed into the housing 16 and may be used in conjunction with the openings 28 to provide the housing 16 with a desired weight. Further, the recessed portion 26 and openings 28 may be positioned at various locations of the housing 16 to provide the housing 16 not only with a desired weight but also with a desired response when vibrated relative to the bracket 18. For example, the recessed portion 26 and/or openings 28 may be substantially centrally located such that most of the weight of the housing 16 is located at an outer periphery of the housing 16.

While the housing 16 is shown as including one recessed portion 26, a pair of generally circular openings 28 and a substantially rectangular opening 28, the housing 16 could include more or fewer recessed portions 26 and openings 28. The number and location of recessed portions 26 and openings 28 may be determined via computer modeling and/or testing of the mass damper 10. For example, the mass damper 10 may be installed on the steering wheel 12 and may be subjected to vibration at various frequencies. The number and location of the recessed portions 26 and openings 28 may be varied until the mass damper 10 reduces or eliminates vibration of the steering wheel 12.

The compartment or cavity 22 may be formed at any location of the housing 16 and may receive an energy-storage medium 30 (FIG. 4) therein. The energy-storage medium 30 may include at least one of a battery and a capacitor to provide the mass damper 10 with the ability to store and selectively provide a source of energy. The energy-storage medium 30 may be received at least partially within the compartment 22 and may be secured therein via a suitable adhesive. Alternatively or additionally, the energy-storage medium 30 may be secured within the compartment 22 via a cover 32 that generally extends over the compartment 22 and, thus, the energy-storage medium 30. The cover 32 may be flush with an outer surface 34 of the housing 16 to provide the housing 16 with a substantially uniform outer surface.

The energy-storage medium 30 may be in electrical communication with a series of wires 36 and a connector 38 that allows the energy-storage medium 30 to selectively provide energy to an external system. The wires may extend through the housing 16 and into the compartment 22 to provide energy to and extract energy from the energy-storage medium 30 depending on the particular configuration of the energy-storage medium 30.

The bracket 18 may be attached to the housing 16 via the projections 20. The projections 20 may be received by apertures (not shown) of the bracket 18 and may be attached to the bracket 18 at the apertures via a suitable adhesive. Alternatively, the projections 20 may be molded into the apertures of the bracket 18 to fix the projections 20 to the bracket 18. Regardless of how the projections 20 are attached to the bracket 18, the projections 20 may be attached at locations of the bracket 18 that correspond to the locations of the apertures 24 of the housing 16. Namely, the pattern of the apertures 24 formed in the bracket 18 may be identical or similar to the pattern of the apertures 24 of the housing 16 such that the projections 20 are aligned with each of the housing 16 and bracket 18.

The bracket 18 may additionally include an extension 40 having an aperture 42. The aperture 42 may be used to fixedly attach the bracket 18 to a hub 44 of the steering wheel 12. Namely, the bracket 18 may be aligned relative to the hub 44 of the steering wheel 12 such that the aperture 42 of the bracket 18 is aligned with an aperture 46 of the hub 44. Once aligned, a fastener 48 may be inserted through the aperture 42 of the bracket 18 and may be threadably received by the aperture 46 of the hub 44 to fix the bracket 18 for movement with the steering wheel 12. The extension 40 may include a pair of wings 50 that engage the hub 44 to position the bracket 18 relative to the hub 44.

Once the bracket 18 is attached to the steering wheel 12 at the hub 44 via fastener 48, the housing 16 is likewise attached to the steering wheel 12 via the projections 20. While the housing 16 is described as being attached to the steering wheel 12 at the hub 44, the housing 16 is permitted to move relative to the hub 44, as the housing 16 is only attached to the bracket 18 via the projections 20. Because the projections 20 may be formed from an elastomeric material, the elastomeric material of the projections 20 allows the housing 16 to move relative to the bracket 18 and, thus, the hub 44 when a force is applied to the housing 16. For example, when a force is applied to the housing 16 in a direction substantially perpendicular to a longitudinal axis of the projections 20, the housing 16 is permitted to translate relative to the bracket 18 and hub 44. Such movement or translation of the housing 16 relative to the bracket 18 allows the housing 16 to damp vibrations experienced by the steering wheel 12 during use.

The mass damper 10 may be hidden from view by a driver airbag 52. Therefore, once the mass damper 10 and driver airbag 52 are assembled to the steering wheel 12, the mass damper 10 is essentially disposed between the hub 44 and the driver airbag 52.

During operation, the steering wheel 12 experiences vibrations caused by operation of the vehicle 14. Such vibration may be experienced by a driver of the vehicle 14, thereby causing an undesirable condition for the driver. The mass damper 10 serves to minimize such vibration by allowing movement of the housing 16 relative to the bracket 18 and hub 44 due to interaction between the housing 16, bracket 18, and projections 20. In other words, the housing 16 is permitted to oscillate relative to the bracket 18 and hub 44 in an effort to reduce the amplitude of mechanical vibrations experienced by the steering wheel 12. The movement of the housing 16 serves to substantially cancel out the mechanical vibration experienced by the steering wheel 12 and, thus, eliminates or reduces the amount of vibration experienced by the driver.

As described, the mass damper 10 may be located relative to the steering wheel 12 to dampen vibrations experienced by the steering wheel 12. Further, the mass damper 10 may include an energy-storage medium 30 that selectively provides energy to an external system. In order to allow the mass damper 10 to adequately absorb vibrations experienced by the steering wheel 12, the housing 16 must have a weight that is within a predetermined range to allow the mass damper 10 to adequately absorb vibrations experienced by the steering wheel 12 within a predetermined frequency range.

The weight of the housing 16 is not only determined based on the amount of material used in forming the housing 16 but, also, is determined based on the weight of the energy-storage medium 30. In other words, the weight of the material used in forming the housing 16 is added to the weight of the energy-storage medium 30 to determine the total weight of the housing 16. Therefore, the energy-storage medium 30 provides multiple functions; storing and selectively providing energy and adding to the overall weight of the housing 16.

If the combined weight of the material used in forming the housing 16 and that of the energy-storage medium 30 exceeds a desired weight, material may be removed from the housing 16 by increasing the size of the recessed portions 26 and/or by including additional recessed portions 26. The overall weight of the housing 16 can additionally or alternatively be reduced by increasing the size and/or number of openings 28 formed in the housing 16.

If the combined weight of the housing 16 and energy-storage medium 30 is less than a desired weight, the size of one or both of the housing 16 and energy-storage medium 30 can be increased. Additionally or alternatively, the number and size of the recessed portions 26 and openings 28 can be reduced, thereby increasing the overall weight of the housing 16.

Figure 5:
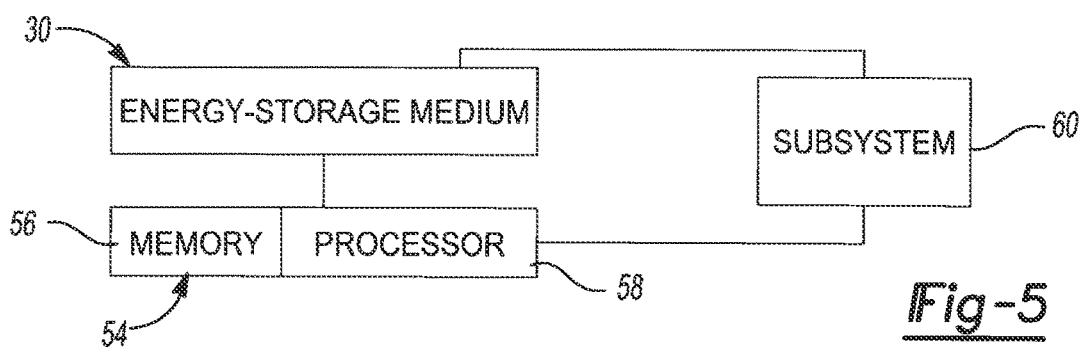
FIG. 5 is a schematic representation of a control system in accordance with the principles of the present disclosure.

With particular reference to FIG. 5, the energy-storage medium 30 is shown in communication with a controller 54 having a memory 56 and a processor 58. In one configuration, the energy-storage medium 30 may be in communication with the controller 54 via wires 36 and connector 38.

Figure 1:
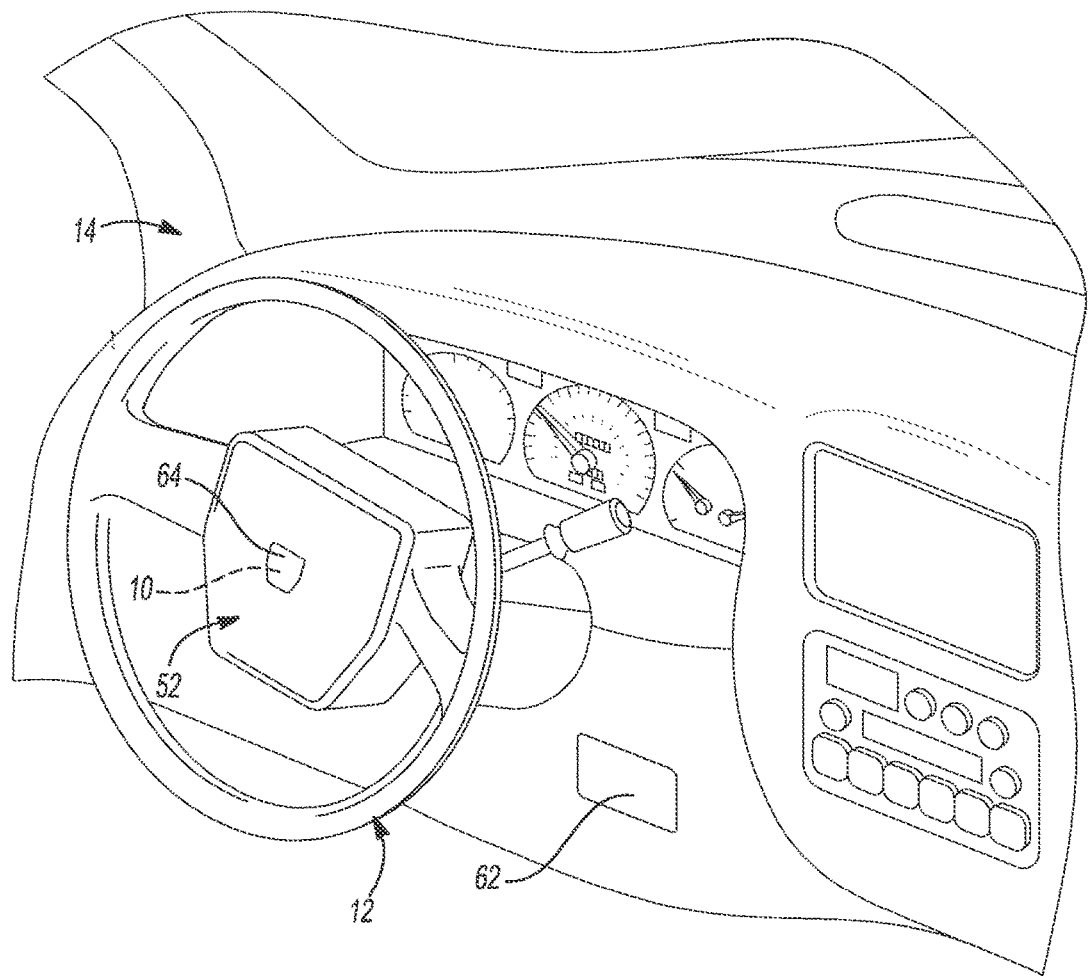
FIG. 1 is a partial perspective view of a vehicle in accordance with the principles of the present disclosure.
Figure 2:
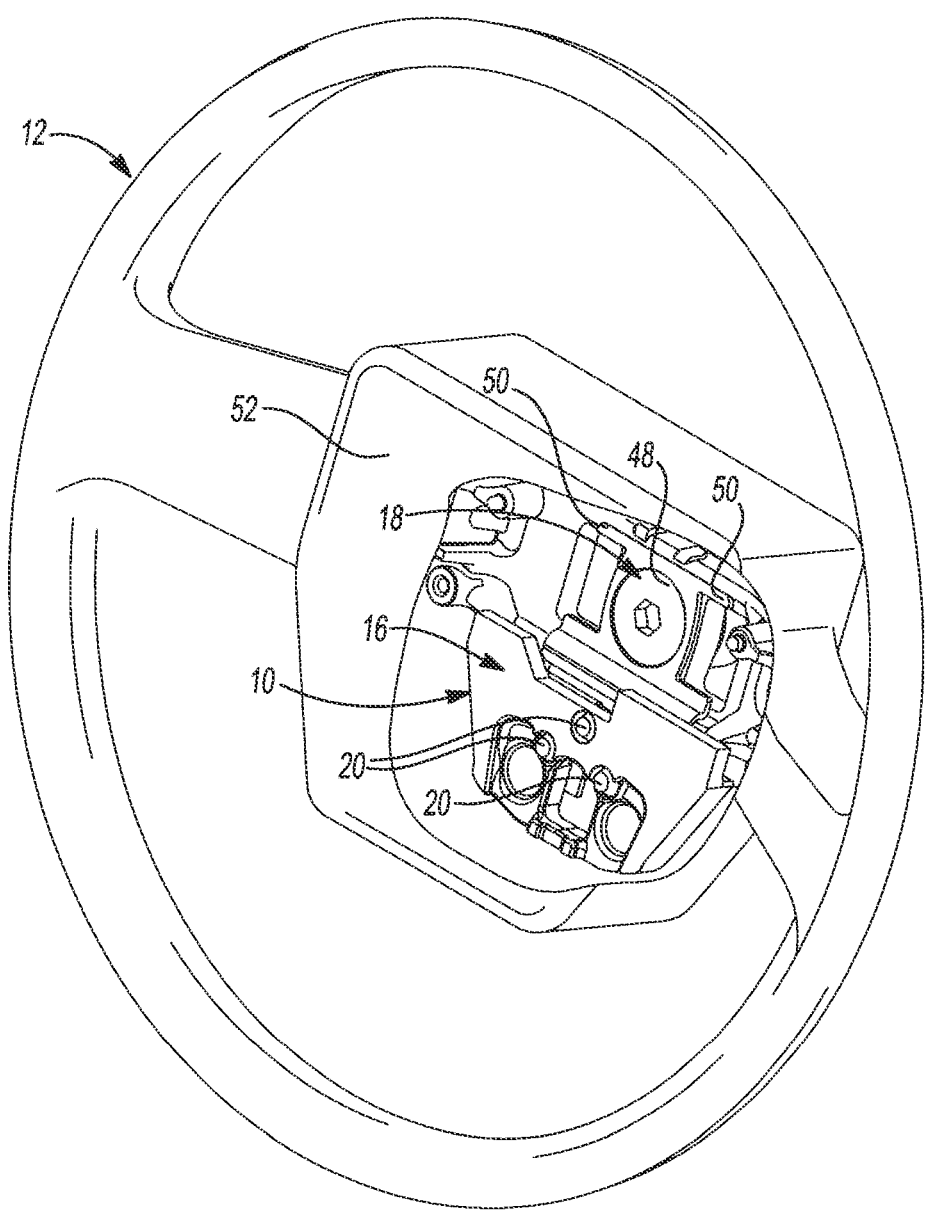
FIG. 2 is a perspective view of a steering wheel in accordance with the principles of the present disclosure with part of a housing removed to show internal components of the steering wheel.

The processor 58 may control operation of the energy-storage medium 30 by controlling the amount of energy stored by the energy-storage medium 30 and by controlling the amount of energy provided by the energy-storage medium 30. For example, the processor 58 may direct energy to the energy-storage medium 30 from a battery (not shown) of the vehicle 14 during periods when excess energy is available to allow the energy-storage medium 30 to function as a capacitor. The processor 58 may identify periods when energy is available for storage by communicating with a central controller 62 (FIG. 1) of the vehicle 14, which may identify periods when the vehicle 14 is not utilizing the total energy provided by the vehicle battery. During these periods, the controller 54 may direct additional energy from the vehicle battery to the energy-storage medium 30 to allow the energy-storage medium 30 to store energy.

The processor 58 may control the energy-storage medium 30 to allow the energy-storage medium 30 to selectively provide power to one or more subsystems 60 of the steering wheel 12. In so doing, the controller 54 effectively controls operation of the subsystem 60. The subsystem 60 may be one or more of a temperature-control system of the steering wheel 12 that selectively heats and/or cools the steering wheel 12, a horn associated with the steering wheel 12, and a light used to illuminate portions of the steering wheel 12.

If the subsystem 60 of the steering wheel 12 is a temperature-control system that provides the steering wheel 12 with a heating effect and/or a cooling effect, the processor 58 may direct energy from the energy-storage medium 30 to the subsystem 60 to allow the subsystem 60 to provide the desired heating effect and/or cooling effect.

Figure 6:
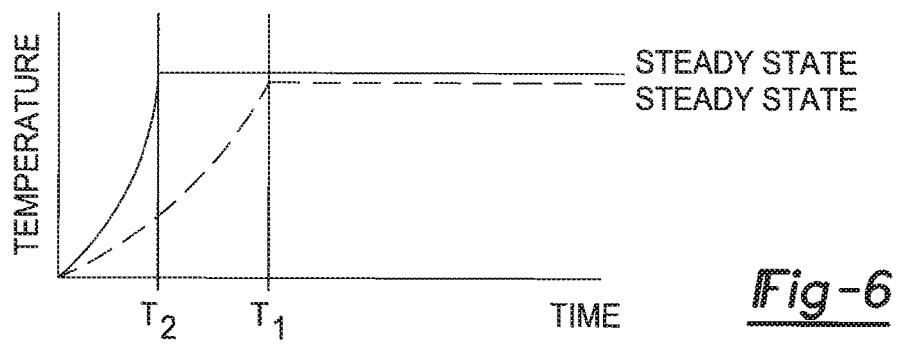
FIG. 6 is a graphical representation of a temperature of a steering wheel versus time illustrating a shortened time period ($T_2$) to reach steady state when employing a control scheme in accordance with the present disclosure.

The energy-storage medium 30 may be used in conjunction with energy provided by the vehicle battery to shorten the time in which the temperature of the steering wheel 12 reaches a steady-state or desired temperature. As illustrated in FIG. 6, when energy from the vehicle battery is used without energy from the energy-storage medium 30, the temperature of the steering wheel 12 does not reach a steady-state or desired temperature until time ($T_1$). However, when energy from the vehicle battery is supplemented with energy from the energy-storage medium 30, the time in which the steering wheel 12 reaches the steady-state or desired temperature is reduced to a time ($T_2$), thereby providing the driver with a desired steering wheel temperature in a shorter period of time.

Once the temperature of the steering wheel 12 reaches the steady-state or desired temperature, the energy required to maintain the steady-state temperature is reduced. As such, the energy-storage medium 30 may be used to maintain the steady-state temperature without requiring energy from the vehicle battery. Even if energy is required from the vehicle battery, such energy is reduced due to the energy contributed by the energy-storage medium 30, thereby allowing the vehicle battery to supply energy to other systems of the vehicle 14.

Allowing the energy-storage medium 30 to selectively provide energy to the subsystem 60 allows the subsystem 60 to be used when the vehicle 14 is not in operation without draining the vehicle battery. Namely, if the subsystem 60 is a light, an emblem 64 associated with the driver airbag 52 may be illuminated when the vehicle 14 is not in operation. Furthermore, an area proximate to an ignition (not shown) may likewise be illuminated using energy from the energy-storage medium 30 when the vehicle 14 is not in operation. If the subsystem 60 is a horn of the vehicle 14, the horn may likewise be actuated with energy from the energy-storage medium 30 without having to rely on energy from the vehicle battery.

While the processor 58 has thus far been described as controlling a subsystem 60 of the steering wheel 12, the processor 58 may alternatively or additionally utilize power from the energy-storage medium 30 to control performance of the mass damper 10. For example, one of the housing 16, bracket 18, and hub 44 may be provided with an electromagnet 66 (FIG. 3) in electrical communication with the energy-storage medium 30. The processor 58 may selectively supply energy from the energy-storage medium 30 to the electromagnet 66 to change the magnetic field between the housing 16 and the bracket 18. The processor 58 may control the amount of current received by the electromagnet 66 in an effort to vary the magnetic field between the housing 16 and the bracket 18, thereby increasing or decreasing the magnetic attraction between the housing 16 and bracket 18.

Increasing the amount of current supplied to the electromagnet 66 from the energy-storage medium 30 increases the magnetic field between the housing 16 and bracket 18, thereby resisting motion of the housing 16 relative to the bracket 18. Conversely, reducing the amount of current supplied to the electromagnet 66 reduces the magnetic field between the housing 16 and bracket 18, thereby increasing the ability of the housing 16 to move relative to the bracket 18.

The processor 58 may be in communication with the controller 62 and may receive information from the controller 62 regarding current vehicle conditions such as the operating speed of the vehicle 14 and the mechanical vibration experienced by the steering wheel 12. The processor 58 may control the amount of current supplied to the electromagnet 66 via the energy-storage medium 30 based on such information to "tune" the mass damper 10. Specifically, the processor 58 may control the degree to which the housing 16 is permitted to move relative to the bracket 18 by controlling the magnetic field between the housing 16 and bracket 18, thereby tailoring the response of the mass damper 10 to the real-time vibrations experienced by the steering wheel 12.

For example, if the controller 62 indicates to the processor 58 that the speed of the vehicle 14 is increasing, the processor 58 may react by decreasing the amount of current supplied to the electromagnet 66. Decreasing the amount of current supplied to the electromagnet 66 allows additional movement of the housing 16 relative to the bracket 18, thereby increasing the ability of the mass damper 10 to absorb mechanical vibrations of a high frequency experienced at the steering wheel 12 when the vehicle 14 is traveling at high speeds.

Once the controller 62 indicates that the speed of the vehicle 14 is reduced, the processor 58 can then increase the current supplied to the electromagnet 66 in an effort to increase the magnetic field between the housing 16 and bracket 18, thereby restricting movement of the housing 16 relative to the bracket 18. Restricting movement of the housing 16 relative to the bracket 18 decreases the ability of the mass damper 10 to absorb mechanical vibrations of a high frequency but increases the ability of the mass damper 10 to absorb mechanical vibrations of a lower frequency, which are typically experienced by the steering wheel 12 when the vehicle 14 is traveling at lower speeds.

In addition to being used in conjunction with a subsystem 60 of the steering wheel 12 and with an electromagnet 66 associated with the mass damper 10, the processor 58 may additionally or alternatively utilize energy from the energy-storage medium 30 to power the memory 56 and processor 58. For example, the processor 58 may direct energy from the energy-storage medium 30 to the memory 56 to allow the memory 56 to retain information once the vehicle 14 is turned off. For example, the processor 58 may utilize energy from the energy-storage medium 30 to allow the memory 56 to retain current settings of one or more subsystems 60 of the steering wheel 12 such as, for example, the current temperature setting of the steering wheel 12 and/or whether the temperature-control system was previously set to heat or cool the steering wheel 12. In short, the memory 56 may store customer settings and time history for the various subsystems 60 identified above and may do so utilizing power from the energy-storage medium 30.

Figure 7:
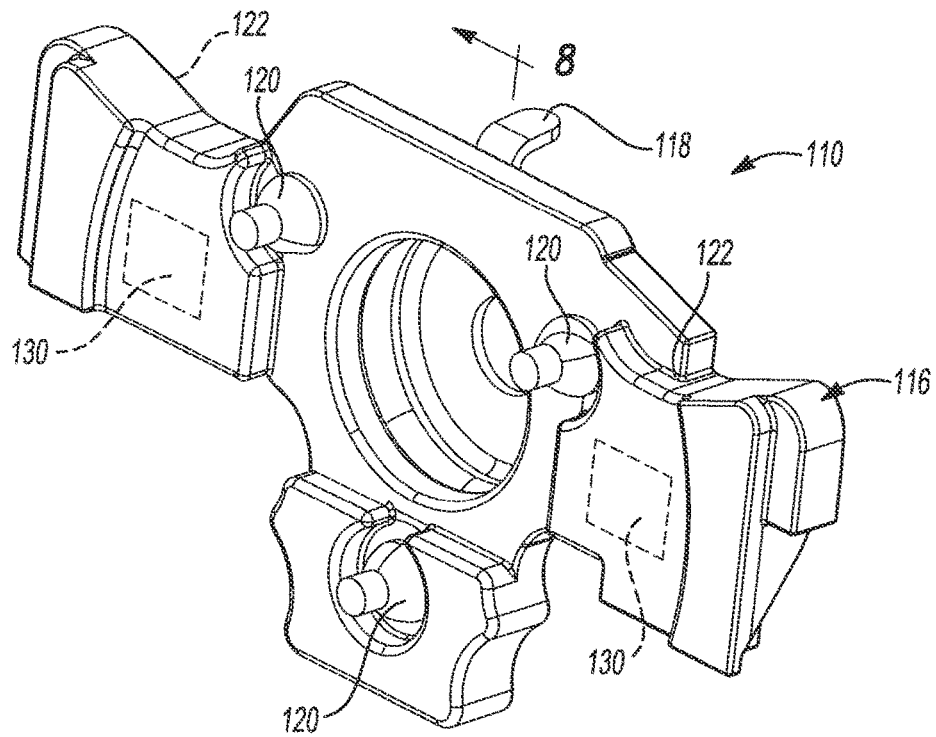
FIG. 7 is a perspective view of a mass damper in accordance with the principles of the present disclosure.
Figure 8:
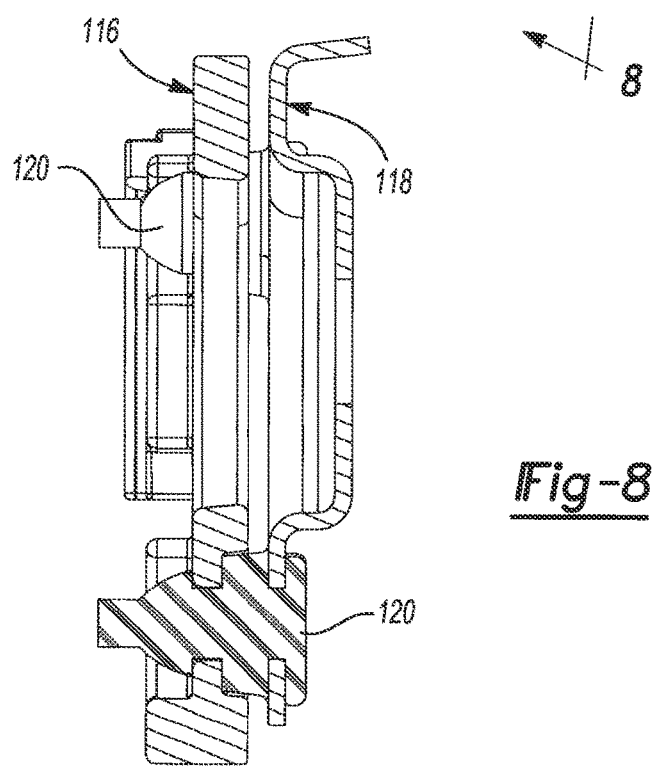
FIG. 8 is a cross-sectional view of the mass damper of FIG. 7 taken along line 8-8.

With particular reference to FIGS. 7 and 8, a mass damper 110 having a different shape and configuration than the mass damper 10 is provided. As with the mass damper 10, the mass damper 110 may include a housing 116, a bracket 118, and a series of projections 120, whereby the projections 120 are formed from an elastomeric material and permit movement of the housing 116 relative to the bracket 118 to absorb vibrations experienced by the steering wheel 12.

The mass damper 110 may likewise include at least one compartment or recess 122 that receives an energy-storage medium 130. As with the energy-storage medium 30, the energy-storage medium 130 may be in communication with a processor 58 for use in selectively supplying energy from the energy-storage medium 130 to at least one subsystem 60 of the steering wheel 12. Because the mass damper 110 and energy-storage medium 130 function in a similar fashion as the mass damper 10 and energy-storage medium 30, respectively, a detailed description of the operation of the mass damper 110 and energy-storage medium 130 is foregone.

Regardless of the particular shape and configuration of the mass damper 10, 110, the energy-storage medium 30, 130 may be used to store and selectively provide energy to one or more subsystems 60 of the steering wheel 12. Additionally, the energy-storage medium 30, 130 may be used to selectively vary a magnetic field between the housing 16, 116 and the bracket 18, 118, thereby allowing the mass damper 10, 110 to be a so-called "tunable" mass damper 10, 110, whereby the vibration response of the mass damper 10, 110 may be altered based on operating conditions of the vehicle 14. Finally, as with the energy-storage medium 30, energy from the energy-storage medium 130 may be used to store customer settings and/or time history of the subsystem(s) 60 of the steering wheel 12 by providing energy to the memory 56 of the controller 54.

What is claimed is:

1. A steering wheel comprising:
   a rim;
   a hub attached to said rim; and
   a mass damper supported proximate to said hub and including a housing and a source of power, said source of power including an electrical energy storage medium, said housing being coupled to said hub by a spring or spring-like material for movement relative to said hub, said electrical energy storage medium being supported by said housing, said housing and said electrical energy storage medium cooperating to provide said mass damper with a desired weight.

2. The steering wheel of claim 1, wherein said housing includes an internal cavity receiving said source of power.

3. The steering wheel of claim 1, wherein said electrical energy storage medium is one of a battery and a capacitor.

4. The steering wheel of claim 1, further comprising a controller supported by said housing and operable to control at least one of said source of power and a system of the steering wheel.

5. The steering wheel of claim 4, wherein said system is at least one of a temperature-control system, a horn, and a light and selectively receives voltage from said source of power.

6. The steering wheel of claim 4, wherein said controller stores operating parameters of said system.

7. The steering wheel of claim 1, wherein the spring or spring-like material is an elastomeric material disposed between said housing and said hub and supporting said housing for movement relative to said hub.

8. The steering wheel of claim 7, further comprising a bracket coupling said elastomeric material to said hub.

9. The steering wheel of claim 8, wherein one of said housing, said bracket, and said hub includes an electromagnet selectively receiving current to alter a magnetic field between said housing and said bracket to adjust a frequency response of said mass damper.

10. The steering wheel of claim 1, wherein said electrical energy storage medium is configured to supply electrical power to a subsystem supported by the steering wheel.

11. The steering wheel of claim 10, wherein said subsystem is at least one of a horn, a light, and a temperature control system to control a temperature of the steering wheel.

12. The steering wheel of claim 4, wherein said controller includes a memory and a processor.

13. The steering wheel of claim 1, wherein said electrical energy storage medium is disposed within said housing and is offset from a rotational axis of the steering wheel.

14. The steering wheel of claim 1, wherein said mass damper is supported for rotation with said hub about a rotational axis of the steering wheel.

* * * * *